(12) United States Patent
Düppre

(10) Patent No.: US 8,304,669 B2
(45) Date of Patent: Nov. 6, 2012

(54) HOLDING FIXTURE FOR A DRIVE UNIT OF A CONVEYING DEVICE

(75) Inventor: Theo Düppre, Kaiserlautern (DE)

(73) Assignee: Wipotec Wiege-und Positioniersysteme GmbH, Kaiserslautern (DE)

( * ) Notice: Subject to any disclaimer, the term of this patent is extended or adjusted under 35 U.S.C. 154(b) by 406 days.

(21) Appl. No.: 12/094,391

(22) PCT Filed: Nov. 20, 2006

(86) PCT No.: PCT/DE2006/002036
§ 371 (c)(1), (2), (4) Date: Sep. 8, 2008

(87) PCT Pub. No.: WO2007/057000
PCT Pub. Date: May 24, 2007

(65) Prior Publication Data
US 2009/0008158 A1 Jan. 8, 2009

(30) Foreign Application Priority Data
Nov. 21, 2005 (DE) .......................... 10 2005 055 754

(51) Int. Cl.
*G01G 11/00* (2006.01)
*G01G 21/28* (2006.01)
(52) U.S. Cl. .......................... 177/126; 177/145; 177/238
(58) Field of Classification Search ................. 177/145, 177/126, 238–244
See application file for complete search history.

(56) References Cited

U.S. PATENT DOCUMENTS

| | | | |
|---|---|---|---|
| 3,773,124 A | 11/1973 | Bullivant | |
| 4,023,668 A * | 5/1977 | De Santo | 177/16 |
| 4,320,809 A * | 3/1982 | Knothe et al. | 177/243 |
| 4,416,343 A * | 11/1983 | Knothe et al. | 177/180 |
| 4,440,249 A | 4/1984 | Del Rosso | |
| 4,619,337 A | 10/1986 | Behrend et al. | |
| 4,696,357 A * | 9/1987 | Beehler et al. | 177/145 |
| 4,802,540 A | 2/1989 | Grabovac et al. | |
| 4,932,488 A * | 6/1990 | Tsay | 177/145 |
| 4,986,376 A | 1/1991 | Cone | |
| 5,111,896 A | 5/1992 | Porcari et al. | |
| 5,170,857 A | 12/1992 | Phillips et al. | |
| 5,230,391 A * | 7/1993 | Murata et al. | 177/50 |
| 5,294,756 A | 3/1994 | Lauber et al. | |
| 5,304,745 A * | 4/1994 | Rusk et al. | 177/50 |

(Continued)

FOREIGN PATENT DOCUMENTS
DE 23 19 895 A1 10/1974
(Continued)

OTHER PUBLICATIONS
Machine translation of Fujimoto et al (JP 05-248,928) from the JPO website, Jan. 2012.*
(Continued)

*Primary Examiner* — Randy W Gibson
(74) *Attorney, Agent, or Firm* — The Culbertson Group, P.C.

(57) ABSTRACT

A holding fixture for the drive unit of a transport device that transports objects to be weighed is arranged between the transport device and the weighing cell which detects the weight. Thus the weight force to be detected by the weighing cell is transferred to the weighing cell by the holding fixture for the drive unit.

18 Claims, 1 Drawing Sheet

U.S. PATENT DOCUMENTS

| | | | |
|---|---|---|---|
| 5,367,128 A | | 11/1994 | Tsukasa et al. |
| 5,670,752 A | * | 9/1997 | Nakajima .................... 177/145 |
| 5,723,825 A | | 3/1998 | Dolan et al. |
| 5,723,826 A | * | 3/1998 | Kitagawa et al. ............. 177/211 |
| 5,726,393 A | * | 3/1998 | Lyga ......................... 177/25.15 |
| 5,736,685 A | * | 4/1998 | Nakajima .................... 177/145 |
| 5,814,772 A | * | 9/1998 | Nishimura et al. ........... 177/145 |
| 5,869,788 A | * | 2/1999 | Gordon et al. ................. 177/124 |
| 6,309,257 B1 | * | 10/2001 | Huang .......................... 439/731 |
| 6,509,533 B1 | * | 1/2003 | Tanaka et al. ................. 177/126 |
| 6,693,244 B2 | * | 2/2004 | Johnson et al. ............... 177/126 |
| 6,787,713 B2 | * | 9/2004 | Kuechenmeister et al. .. 177/132 |
| 6,830,476 B2 | | 12/2004 | Gesuita et al. |
| 6,958,452 B2 | | 10/2005 | Takahashi |
| 6,987,227 B2 | * | 1/2006 | Wakasa ...................... 177/25.13 |
| 7,002,084 B2 | * | 2/2006 | Cox et al. ...................... 177/238 |
| 7,060,914 B2 | * | 6/2006 | Suzuki .......................... 177/238 |
| 7,208,688 B2 | * | 4/2007 | Jauert et al. ................... 177/238 |
| 7,626,130 B2 | * | 12/2009 | Scholpp ........................ 177/238 |
| 7,750,253 B2 | | 7/2010 | Wineland |
| 8,076,596 B2 | * | 12/2011 | Burkart ........................ 177/238 |
| 8,138,431 B2 | * | 3/2012 | Duppre ......................... 177/126 |
| 2004/0035613 A1 | * | 2/2004 | Wolfe et al. ................... 177/144 |
| 2004/0182612 A1 | * | 9/2004 | Takahashi ..................... 177/119 |
| 2006/0118392 A1 | * | 6/2006 | El-Ibiary ................. 198/781.03 |
| 2007/0289783 A1 | * | 12/2007 | Tump ............................ 177/200 |
| 2008/0078589 A1 | * | 4/2008 | Scholpp ........................ 177/244 |
| 2009/0090566 A1 | | 4/2009 | Ruth et al. |

FOREIGN PATENT DOCUMENTS

| | | |
|---|---|---|
| DE | 33 18 409 C2 | 10/1984 |
| DE | 69616097 | 5/2002 |
| DE | 203 03 126 U1 | 4/2004 |
| EP | 0722082 A1 | 7/1996 |
| EP | 1 101 715 A1 | 5/2001 |
| EP | 1 400 789 A2 | 3/2004 |
| GB | 2 097 544 A | 11/1982 |
| JP | 05-248928 A | 9/1993 |
| JP | 07-146170 A | 6/1995 |
| JP | 10-122944 A | 5/1998 |
| JP | 10-142033 A | 5/1998 |
| JP | 11343018 A | 12/1999 |
| JP | 2000-266590 A | 9/2000 |
| JP | 2004-340593 | 12/2004 |

OTHER PUBLICATIONS

Machine translation of Tanaka (JP 10-122,944) from the JPO website, Jan. 2012.*

JPO, Notification of Reasons for Rejection dated Mar. 9, 2011 in corresponding Japanese Patent Application No. 2008-541583 (10 pages).

JPO, Notification of Reasons for Rejection dated Mar. 23, 2011 in Japanese Patent Application No. 2008-541585 (7 pages).

GPTO, Examination Report dated Jul. 21, 2006 in German application No. 10 2005 055 753.8-53 (4 pages).

USPTO, Office Action Summary dated Aug. 6, 2010 in U.S. Appl. No. 12/094,393 (12 pages).

USPTO, Office Action Summary dated Jan. 14, 2011 in U.S. Appl. No. 12/094,393 (6 pages).

USPTO, Office Action Summary dated Apr. 21, 2011 in U.S. Appl. No. 12/094,393 (11 pages).

JPO, Decision of Rejection issued Jul. 29, 2011 in corresponding Japanese Patent Application No. 2008-541583 (5 pages).

* cited by examiner

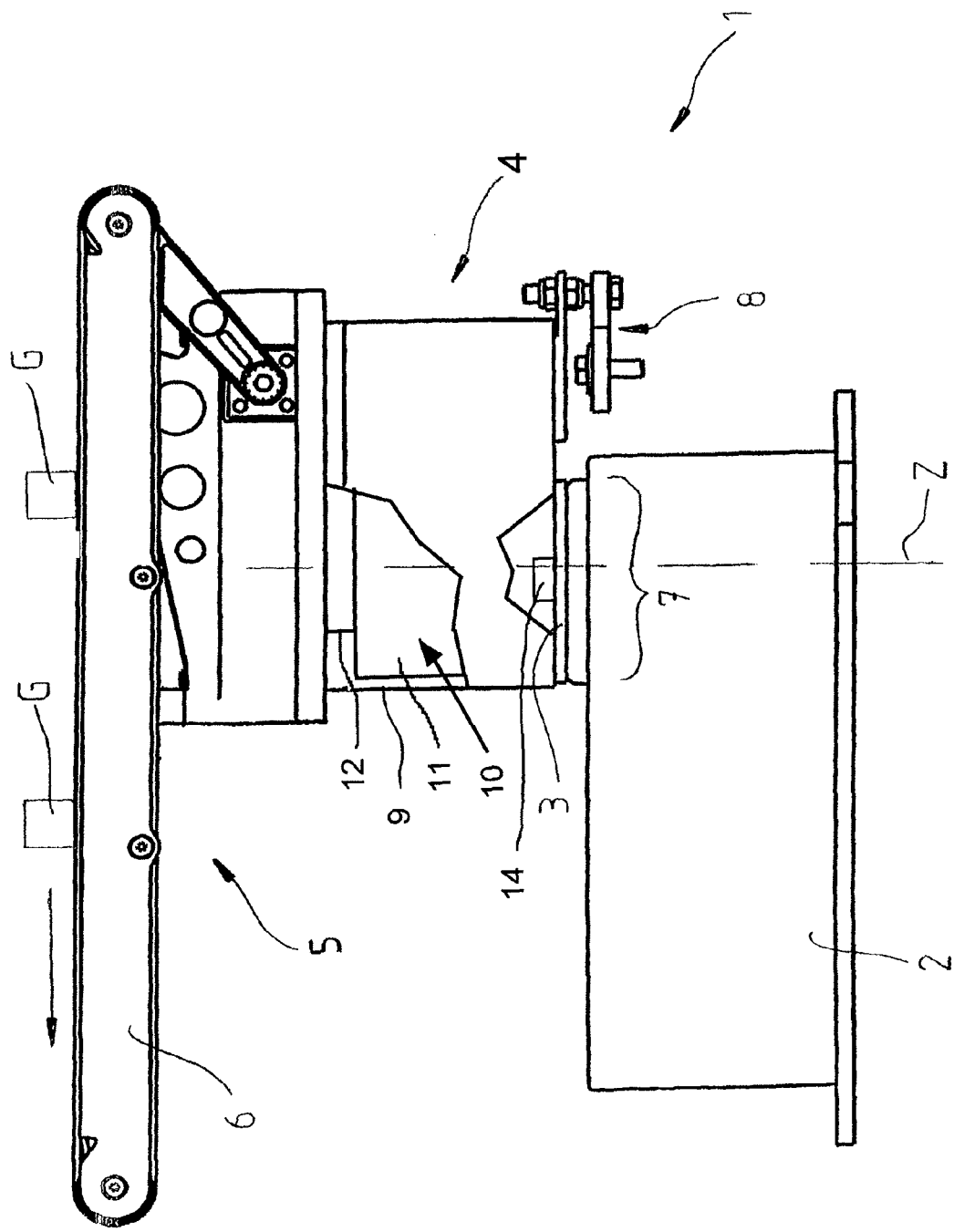

HOLDING FIXTURE FOR A DRIVE UNIT OF A CONVEYING DEVICE

TECHNICAL FIELD OF THE INVENTION

The present invention relates to a holding fixture for the drive unit of a transport device and to a scale with at least one such holding fixture.

BACKGROUND OF THE INVENTION

Scales that weigh transported products are known from weighing technology. A transport device that transports the products to be weighed is usually provided. This transport device acts on the load receptor of a weighing cell and thus transmits the weight of products moved on the transport device.

It is additionally known that the transport device is driven by a motor arranged on the transport device. The weight of the motor has a deleterious effect on the transport device, since the latter can be deformed by the mass of the motor and impacts can be produced during product loading and unloading.

The problem of the invention is therefore to create a scale for transported products that minimizes the influence of the motor on the transport device of the entire scale in mechanical and metrological respects.

A transport device for use with a weighing scale according to the invention is constructed for transporting products whose weight force is to be detected by the weighing cell of a the scale. The weighing cell experiences the weight force to be detected via a force introduction area and in the direction of an imaginary force introduction axis penetrating this introduction area. The force introduction area is typically the upper side of a load receptor of the weighing cell, the force introduction axis generally running perpendicular thereto. Arrangements in which the weight force is introduced into the load receptor from below are known and are affected in the same manner. The load then lies not on top of the load receptor, but is suspended from it.

According to the invention, a holding fixture that contains the drive unit for the transport device can be provided between the weighing cell and the transport device in order thereby to introduce the weight force from the transport device through the holding fixture into the weighing cell or load receptor. The holding fixture of the drive unit thus explicitly serves to transfer the weight force from the transport device into the weighing cell. In this regard it forms the only connecting member between these components. Moreover, a stable and light construction of the scale is made possible by the rigidity or stability of the holding fixture, made, for example from screwed-together aluminum plates.

Several disadvantages of the prior art are overcome by such an arrangement. The frequently encountered arrangement of the motor to the side of the force introduction axis, or eccentrically to the load receptor, often led to edge load errors.

With an eccentric arrangement of the drive unit, vibrations of the floor in some cases resulted in large torques in the area of the load introduction, whereby weighing signals are falsified and measures for vibration correction are made more difficult.

In the present invention, the drive unit (to be understood below as at least one motor, optionally a gear assembly or the like as well, for driving the transport device) is held by the fixture, which simultaneously serves to transfer the weight forces. The holding fixture (and thus the drive unit held therein as well) is preferably arranged substantially above the force introduction area of the weighing cell, without having a significantly asymmetrical shape relative to the weighing cell. The drive unit is thereby moved at least into the vicinity of the force introduction axis, so that eccentric loads on the load receptor resulting from the weight force of the drive unit are reduced or avoided.

Since the drive unit is arranged according to the invention in the holding fixture (and not separately or apart from the structure that transmits the weight force, namely on the side of the transport device), the mechanical loads on the transport device are markedly reduced, whereby service life is increased and simple construction becomes possible.

This advantage is seen particularly if differently dimensioned transport devices are to be employed for the scale using the same drive. Since the drive unit is suspended or retained separately from the transport device, different dimensions of the various transport devices have no effect, or only an insubstantial one, because the motor is always supported by the holding fixture and substantially maintains its arrangement in space. Various corner load effects when different transport devices are used can thereby be avoided.

The fact that the invention supports or makes possible the modular construction of the scale consisting of a weighing cell, holding fixture and a transport device must be emphasized. Thus the holding fixture along with the drive can be understood as a module which can be optionally combined with a suitable weighing cell, on the one hand, or a transport device on the other. For instance, different transport devices can be placed upon a selected combination of weighing cell and holding fixture. On the other hand, the holding fixture with the drive unit can be exchanged between a transport device and the weighing cell in a modular manner, for example.

Another advantageous embodiment of the invention provides that the drive unit is arranged in the holding fixture such that the center of gravity resulting from the holding fixture and the drive unit lies substantially close to or within the force introduction axis. This results in the advantage that the weighing cell does not experience any eccentric loads, which would result from the weight force of the holding fixture together with the drive unit, particularly if the drive unit were arranged remote from the force introduction axis. This stabilizes the structure of the scale and simplifies the evaluation of the measured values.

Another advantageous embodiment of the invention provides that the drive unit is arranged in the holding fixture such that the resulting center of gravity of the holding fixture, the drive unit and the transport device lies substantially close to or within the force introduction axis. This further stabilizes the structure of the scale since eccentric loads that may occur are then avoided by the transport device. At least all static weight forces then act substantially along the force introduction axis into the weighing cell, without forming disruptive torques. The products conveyed by the transport device can be ignored for the stability of the overall structure and the weighing process, depending on the weight, so long as the other components (transport device, holding fixture with drive unit) in total represent the essential masses.

According to another advantageous embodiment of the invention, the holding fixture has a metallic, substantially tightly encapsulated housing for electromagnetic compatibility. The drive unit is accommodated therein and is enclosed to the greatest extent possible. The motor, with its usually high electromagnetic radiation, is advantageously optimally encapsulated in order to minimize the influence of high-frequency radiation on adjacent components. The electromagnetic emissions are then sharply reduced if all components are implemented in metallic or metallized form and are low-ohmically connected to one another conductively (grounded). Influences on adjacent electronic devices in particular are optimally avoided.

An alternative or additional embodiment of the invention provides that the holding fixture is enclosed by a housing for removing or shielding heat from the drive unit contained therein. On the one hand, the housing can have a thermal insulating effect in order not to allow the heat losses of the motor to reach the exterior of the holding fixture. This makes sense if the products conveyed by the transport device are heat-sensitive.

On the other hand, the housing can optimally divert heat by a suitable selection of the nature and/or size of its surface. The locally high temperatures in the direct vicinity of the motor that are familiar from prior art can thereby be avoided. Due to the naturally larger surface area of the holding fixture relative to the drive unit contained therein, the heat produced by the latter can be carried off over a larger surface area, so that the surface temperature decreases. Locally extreme temperatures are thereby prevented. This too serves to protect the conveyed products. A higher motor power can be achieved by a better heat removal, or the surface temperature for a constant motor power can be reduced. The operating parameters of the scale are thereby optimized.

An additional or alternative embodiment of the invention provides that the holding fixture is surrounded by a housing for ingress protection of the components arranged therein. Motors with integrated electronics in particular are thereby safely protected, and can be used in a wet area. The scale and, in particular, the drive unit contained in the holding fixture are protected by this ingress protection against, among other things, cleaning fluids, spraying water or the use of steam cleaners, or against influences of humidity in general. The modular construction also facilitates disassembly for optional separate cleaning of the individual components.

The ingress protection can be advantageously implemented such that fluid that may possibly enter the housing at a downward-pointing opening can be securely and controllably removed. The ingress protection can additionally be implemented in such a manner that a drive train set up for the transport device can largely be covered or enclosed so that it too is optimally protected against spray water, product residues or unauthorized contact (ingress protection).

The aforementioned housings can be constructed in particular from special steel in order to meet requirements in the field of food technology. In principle, however, any material is suitable for optimally meeting the individual requirements. A combination of different materials with which electromagnetic or ingress-protection or thermal problems can be solved is also possible.

Another advantageous embodiment of the invention provides that the holding fixture has a plug connection on its side facing the weighing cell. This can be a mechanical and/or an electrical plug connector that interacts with a complementary plug connector formed on the weighing cell. The purpose of this plug connector is to detachably connect the holding fixture and/or the drive unit arranged therein mechanically and/or electrically to the weighing cell.

The simultaneous production of a mechanical and an electrical connection by means of the aforementioned plug connector lowers the assembly expense and reduces downtime. This is particularly advantageous in the food technology field, where rapid assembly and disassembly of the components for many purposes is frequently necessary and therefore must be done as easily as possible.

Electrical connections in particular are advantageously led to the weighing cell or its load receptor into the holding fixture without separate or external cables being required. Electrical connection is performed exclusively via the rigidly constructed plug connector, and serves to transfer all signals or currents that are provided for the drive unit or additional components of the holding fixture or the transport device. Lines/cables to be led from the outside into the holding fixture or the transport device are thereby advantageously eliminated.

First of all, this avoids the expense for the connection of the drive and the cabling. By avoiding the cables, the influence of electromagnetic radiation on or from these cables is also avoided, which leads to a particularly secure operation.

Moreover, the electrical plug connection can be designed to be explosion-proof in order to meet special safety standards. An embodiment as an ingress-protected plug connection is also provided as well as a connection that is particularly well-protected against emission or reception of electromagnetic radiation. Combinations of the selected protective measures are also possible.

The electrical connection of the holding fixture by means of the above-described plug connection additionally proves advantageous since the transport device per se can be designed without any kind of electrical connection. Only a mechanical connection to the drive unit of the holding fixture need be produced for operational readiness. The transport device can thereby be designed completely without electrical connections and thus in a simple form as a non-electrical operating means.

Insofar as a plug connection is constructed as a mechanical connection alternatively or in addition to the electrical configuration, this permits the holding fixture to be positioned on the weighing cell in a particularly simple manner. The holding fixture can be precisely oriented and fixed relative to the weighing cell or its load receptor by means of suitable stop means or pins. The complete connection of the holding fixture to the weighing cell, mechanically and electrically, can be realized in a particularly simple manner with the combined mechanical and electrical plug connection. Depending upon the embodiment, it can be sufficient to set the holding fixture onto the weighing cell, with mechanical and electrical contacts engaging with one another and making the desired connection.

The electrical plug connection can preferably be configured such that electrical contacts can be disconnected from or connected to one another in a predetermined sequence during the insertion of the holding fixture into, or its removal from, the weighing cell. This can be advantageously used to enable certain electrical connections only when other connections have been made. Thus, for instance, the supply of power to the motor inside the holding fixture can be performed only if a predetermined electrical or electromechanical contact has been operated or closed, for example. This increases the safety when the device is put into operation. The same applies conversely to the breaking of the connection.

Another advantageous embodiment of the invention provides that the electrical connection can be automatically produced or disconnected by placing the holding fixture onto or removing it from the weighing cell. This embodiment constructs the above-described electrical plug connector such that the connection is accomplished exclusively by inserting the holding fixture into the weighing cell without having to form additional plug or cable connections. Conversely, the complete electrical disconnection of the holding fixture can be achieved by removing the holding fixture from the weighing cell, without other disassembly or unplugging work having to be done.

Another advantageous embodiment of the invention with an electrical plug connection as described above has a protection mechanism that protects the electrical contacts on the weighing cell and/or the holding fixture against unintended contact during disconnection. This is intended to ensure that the contacts of the plug connection are not unintentionally touched when the holding fixture has been removed. In this way, short-circuits can be avoided, as well as damage to data processing equipment or danger to operating personnel. The contacts themselves are also protected against contamination or damage. A special protection of the connection or its contacts can also be directed against the penetration of moisture or cleaning agents, as was already mentioned above.

In its simplest form, the protection mechanism can be constructed as an automatically operable protective cap which sits down on the contacts when the plug is disconnected. When the holding fixture is placed on the weighing cell, this protective cap is automatically pushed aside in order to enable the formation of the electrical connection.

The plug connector can also be torsion-proof or protected against misconnection.

Another advantageous embodiment of the invention provides that the holding fixture can be detachably connected or locked to the weighing cell and/or the transport device via a locking mechanism that can preferably be operated without tools. The purpose of this embodiment is the particularly simple and easy insertion or exchange of the holding fixture, or its connection to the transport device and/or the weighing cell. A suitable manually operated locking mechanism guarantees such a rapid connection or disconnection capability without requiring separate fastening parts (screws, nuts, etc.). This increases the component safety for the device. Particularly in the food sector, this also prevents (metallic) fastening means from unintentionally getting into the product or staying there. Forgoing tools also eliminates the danger of such tools, their lubricants, etc., coming into contact with the products.

Moreover, the modular character of the holding fixture in combination with the transport device and the weighing cell is emphasized by this locking mechanism. The above-mentioned components can be easily connected or disconnected and exchanged by simple operation of the locking mechanism.

The width of the holding fixture is advantageously chosen to be not greater than the width of the transport device and the weighing cell. "Width" is to be understood to mean that which is transverse to the direction in which the transport device transports the goods. Insofar as the width of the holding fixture does not exceed the width of the transport device and the weighing cell, several transport devices, each with a holding fixture in the weighing cell, can be advantageously arranged one alongside the other, whereby a multitrack weighing system is formed. This is possible, advantageously with respect to prior art, because the drive unit for the transport device is arranged essentially underneath the latter and does not project laterally past the width of the transport device, for instance. Since the track separation of the individual transport devices is thereby sharply reduced, an overall narrow construction of a multitrack scale that comprises several transport devices with the associated holding fixture and weighing cell becomes possible.

Another advantageous embodiment of the invention provides that the holding fixture comprises drive means which can be connected to the transport device at a coupling point for its conveyance operation. This coupling point is intended according to the invention to lie between at least two conveyance elements of the transport device, with these conveyance elements moving the products in the conveyance direction. Such an embodiment of the holding fixture advantageously permits a space-saving connection of the driver unit to the transport device. In contrast to transport devices known from prior art, the introduction of the drive power is introduced here only inside the width of the transport device, this width being defined by at least two conveyance elements of the transport device a maximal distance apart that transport goods in the conveyance direction.

Such a transport device is typically a belt element comprising at least two rollers spaced apart from one another, about which two or more conveyance elements (transport belts, straps, chains, etc.) run parallel to one another. The drive means, which run from the drive unit in the direction towards the belt elements, are then constructed, for instance, as a toothed belt wrapped around at least one of the two rollers. Whereas in the prior art the drive belt always engages at a free end of the roller, but at least outside the maximally spaced-apart conveyance elements, the holding fixture of the invention permits the introduction of drive force between the conveyance elements as well, so that the transport devices overall can be arranged with narrow spaces between one another. The selected engagement of the drive means additionally provides the possibility of removing the transport belts very easily at one side of the transport device or the other, without obstruction by components. This facilitates or accelerates cleaning or exchange of the conveyance elements.

In another advantageous embodiment of the invention, an overload safety device that interacts with the housing of the weighing cell or another contact component is provided on the holding fixture. This protects the weight-loaded elements of the weighing cell against excessive loads. The contact component is stable, and should be constructed as a fixed area relative to the moving components of the weighing cell. The holding fixture, arranged between the transport device and the content components, favors the arrangement of the overload safety device on the holding fixture and obviates the special construction effort that would otherwise be necessary.

The above-mentioned holding fixture can be an object of scales that detect the weight of moving products when a transport device is being used.

These and other advantages and features of the invention will be apparent from the following description of the preferred embodiments, considered along with the accompanying drawings.

BRIEF DESCRIPTION OF THE DRAWING

An embodiment of the invention will be described below with reference to a FIGURE example. The FIGURE shows a schematic side view of a scale with a holding fixture according to one embodiment of the invention.

DESCRIPTION OF ILLUSTRATIVE EMBODIMENTS

As shown in the FIGURE, a scale 1 comprises a weighing cell 2, which is provided for detecting weight forces. Weighing cell 2 has a load receptor 3 in an upper area, which defines a force introduction area 7, via which the weighing cell can be subjected to a weight force to be detected. The weight force is typically applied in the direction of an imaginary force introduction axis Z perpendicular to load receptor 3.

Scale 1 further comprises a transport device 5. By means of a conveyor belt 6, this transport device 5 transports products G, the weight of which is to be detected by a weighing cell 2.

In order to transfer the weight forces of products G to load receptor 3 of weighing cell 2, a holding fixture 4 is inserted between transport device 5 and weighing cell 2. Holding fixture 4 includes a holding fixture structure 9 which is partially cut away in the FIGURE to diagrammatically show a drive unit 10 which includes a motor 11 and drive means 12. Drive means 12 is connected to transport device 5 to allow holding fixture 4 to drive conveyor belt 6 of transport device 5.

By means of this arrangement, the flow of the weight force is advantageously introduced through holding fixture 4 accommodating the drive unit into weight cell 2 or its load receptor 3. Holding fixture 4 in the illustrated embodiment has a plug connector 14 on its side facing weight cell 2. This plug connector 14 interacts with a complementary plug connector (not shown) formed on the weight cell 2 to provide a mechanical and electrical connection between the weight cell 2 and the holding fixture 4.

Holding fixture 4 further comprises an overload safety device 8 that cooperates with a component (not shown in detail). This component can be the housing of weighing cell 2 or another fixed area suited to absorb excessive loads.

As used herein, whether in the above description or the following claims, the terms "comprising," "including," "carrying," "having," "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A holding fixture for a weighing scale, the weighing scale including a transport device which transports objects to be weighed by the weighing scale, the holding fixture including:
   (a) a holding fixture structure adapted to be mounted in an operating position between the transport device and a weighing cell for the weighing scale, the holding fixture structure in the operating position being mounted so as to transmit the weight force to be detected from the transport device to a force introduction area of the weighing cell through which the weighing cell experiences the weight force to be detected;
   (b) a drive unit arranged in the holding fixture structure such that the holding fixture structure and drive unit together form a module, wherein when the holding fixture structure is in the operating position the module is connected exclusively (i) to the weighing cell within the force introduction area and (ii) to the transport device, with at least one motor included in the drive unit adapted to drive the transport device; and
   (c) wherein the weighing cell experiences the weight force to be detected in the direction of an imaginary force introduction axis passing through the force introduction area.

2. The holding fixture of claim 1 wherein the drive unit is arranged in the holding fixture structure such that when the holding fixture structure is in the operating position the center of gravity resulting from the holding fixture structure and the drive unit lies substantially close to or within the force introduction axis.

3. The holding fixture of claim 1 wherein the drive unit is arranged in the holding fixture structure such that when the holding fixture structure is in the operating position the resulting center of gravity of the holding fixture structure, the drive unit, and the transport device lies substantially close to or within the force introduction axis.

4. The holding fixture of claim 1 wherein the holding fixture structure includes a metallic and substantially tightly encapsulated housing for electromagnetic shielding.

5. The holding fixture of claim 1 wherein the holding fixture structure includes a housing for removing or shielding drive heat from the drive unit.

6. The holding fixture of claim 1 wherein the holding fixture structure includes a housing for ingress protection of the components arranged therein.

7. The holding fixture of claim 1 wherein the holding fixture structure includes a housing for explosion protection of the components arranged therein.

8. The holding fixture of claim 1 wherein the holding fixture structure has on its side facing the weighing cell a mechanical and electrical plug connector cooperating complementarily with the weighing cell, with which the holding fixture structure and the drive unit arranged therein is detachably connectable to the weighing cell.

9. The holding fixture of claim 1 wherein the holding fixture structure includes an electrical connection, and wherein the electrical connection is explosion-protected, ingress-protected, or electromagnetic shielding encapsulated.

10. The holding fixture of claim 1 wherein the holding fixture structure includes an electrical connection to the weighing cell through which electrical signals required by the drive unit are communicated and wherein the electrical connection is automatically made by placing the holding fixture structure on the weighing cell and is automatically broken by removing the holding fixture structure from the weighing cell.

11. The holding fixture of claim 1 wherein the holding fixture structure includes an electrical connector having a protection mechanism that automatically protects electrical contacts on the weighing cell, or the holding fixture structure, or both the weighing cell and the holding fixture structure against unintentional contact during the breaking of an electrical connection with the electrical connector.

12. The holding fixture of claim 1 wherein when the holding fixture structure is in the operating position, drive means associated with the drive unit is connected to the transport device for its conveying operation at a coupling point lying between at least two conveying elements that move the products in a conveyance direction.

13. The holding fixture of claim 1 wherein an overload safety device cooperating with the weighing cell or another contact component is provided on the holding fixture structure.

14. A weighing scale including:
   (a) a weighing cell including a force introduction area through which the weighing cell experiences a weight force to be detected, the weight force to be detected acting in the direction of an imaginary force introduction axis passing through the force introduction area;

(b) a transport device which transports objects to be weighed by the weighing cell;

(c) a holding fixture structure mounted between the transport device and the force introduction area of the weighing cell, the holding fixture structure being mounted so as to transmit the weight force to be detected from the transport device to the weighing cell; and (d) a drive unit including at least one motor adapted to drive the transport device, the drive unit being arranged in the holding fixture structure so that the drive unit and holding fixture structure together form a module, the module being connected exclusively (i) to the weighing cell within the force introduction area and (ii) to the transport device.

15. The weighing scale of claim 14 wherein the drive unit is arranged in the holding fixture structure such that the center of gravity resulting from the holding fixture structure and the drive unit lies substantially close to or within the force introduction axis.

16. The weighing scale of claim 14 wherein the drive unit is arranged in the holding fixture structure such that the resulting center of gravity of the holding fixture structure, the drive unit, and the transport device lies substantially close to or within the force introduction axis.

17. The weighing scale of claim 14 wherein the holding fixture structure has on its side facing the weighing cell a mechanical and electrical plug connector cooperating complementarily with the weighing cell, with which the holding fixture structure and the drive unit arranged therein is detachably connectable to the weighing cell.

18. The weighing scale of claim 14 further including an electrical connection between the holding fixture structure and the weighing cell through which electrical signals required by the drive unit are communicated, and wherein the electrical connection is automatically made by placing the holding fixture structure on the weighing cell and is automatically broken by removing the holding fixture structure from the weighing cell.

* * * * *